Sept. 15, 1942.  L. S. WILLIAMSON  2,295,768
STORAGE BATTERY CARRIER
Filed June 7, 1941
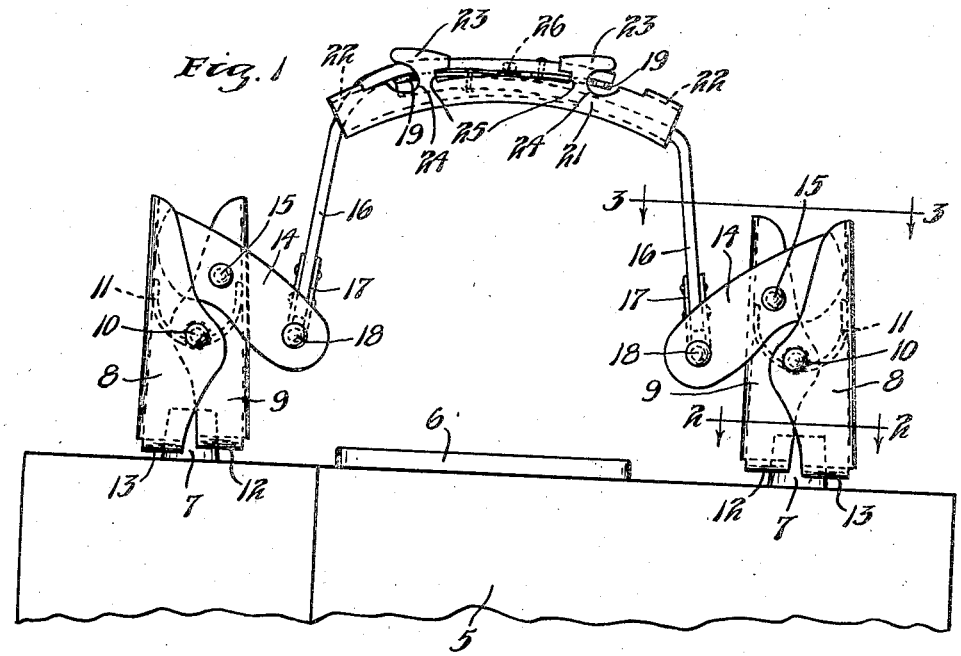
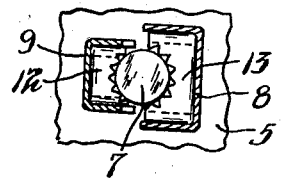
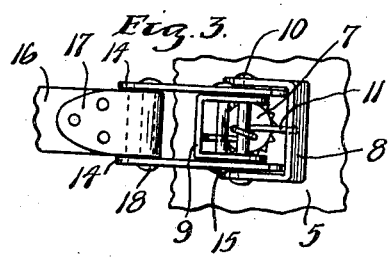
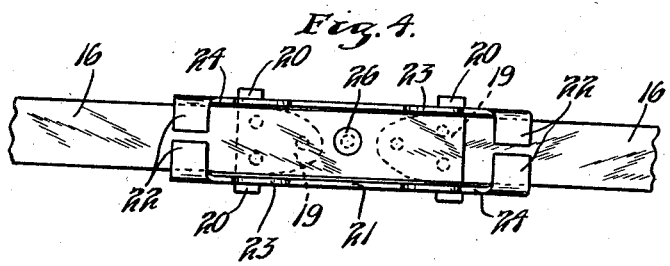
INVENTOR.
LEON S. WILLIAMSON.
BY HIS ATTORNEYS.
Williamson & Williamson Patented Sept. 15, 1942

2,295,768

UNITED STATES PATENT OFFICE 2,295,768

STORAGE BATTERY CARRIER

Leon S. Williamson, Minneapolis, Minn., assignor of one-half to Modiste L. Le Gro, Minneapolis, Minn.

Application June 7, 1941, Serial No. 397,030

8 Claims. (Cl. 294—116)

This invention relates to article carriers and more particularly to devices for carrying storage batteries.

A number of different tools have been devised for carrying batteries. They usually either hook beneath the cell connecting straps or they are adapted to engage the battery posts by means of some quick detachable connector. One common type of carrier employs relatively flat apertured plates which are adapted to fit over the battery posts and grip them when the plates are tilted at an angle, these plates being connected to the ends of handle straps. However, due to corrosion and wear the apertured plates frequently do not fit properly and the battery may slip and be dropped and broken.

It is an object of my invention to provide a battery carrier which includes post gripping units which have a positive and quick acting gripping action.

Another object of the invention is to provide a battery carrier wherein the post gripping units can be interchangeably connected with either the positive or negative posts of a battery, such posts usually being of different sizes.

It is another object of the invention to provide a battery carrier with means for initially gripping the post and additional means for increasing the gripping action as the battery is lifted up and maintaining it the entire time it is suspended from the carrier.

Still another object of the invention is to provide a battery carrier having an improved adjustable handle strap to make it quickly adaptable for batteries which vary considerably in length.

These and other objects and advantages of the invention will more fully appear from the following description made in connection with the accompanying drawing, wherein like reference characters refer to the same parts throughout the views, and in which:

Fig. 1 is a side elevation of my carrier with a portion of the storage battery turned obliquely and having the carrier attached thereto;

Fig. 2 is a section taken on the line 2—2 of Fig. 1;

Fig. 3 is a section taken on the line 3—3 of Fig. 1; and

Fig. 4 is a fragmentary plan view of the handle and its cooperating straps.

In Fig. 1 there is shown the upper portion of a conventional electric storage battery 5. A cell connecting strap 6 is shown as well as terminal posts 7. Mounted on each terminal post is a gripping unit including jaws 8 and 9. Said jaws are pivotally connected intermediate their ends by means of pins 10, and a spring 11 is coiled around the pin 10 with its ends engaging the inner side walls of the jaws 8 and 9. As best shown in Fig. 1, the ends of the spring extend upwardly above the pivot 10 thus tending to force the upper ends of jaws 8 and 9 apart and, of course, bringing the lower ends of said jaws together. Said lower ends of said jaws 8 and 9 are best shown in Fig. 2 and include portions 12 and 13 which have substantially semi-circular cut-outs defined by a series of teeth to provide non-slipping gripping portions for said jaws. Pivotally connected to each of the jaws 9 are cam members 14 which move about a pin 15 extended between the sides of the jaw 9. Each pair of cam members 14 has pivotally connected to its downwardly and outwardly extending portions a strap 16 which has a metal clip 17 bent around a pivot pin 18 which extends between the cam members 14. There is a separate strap 16 for each pair of cam members 14 and pair of jaws 8 and 9. The other end of each strap 16 has a plate 19 riveted or otherwise secured thereto, and said plate has laterally extending projections 20 which are wider than the remainder of the strap.

A lifting and carrying handle 21 is shown in Figs. 1 and 4 and this handle is generally U-shaped in cross section with a pair of inwardly turned ears 22 at its ends. These ears provide retainer loops for the straps 16. The sides of the handle 21 are provided with upstanding generally T-shaped catches 23 and the heads of the members 23 define notches 24 and 25. The laterally projecting portions of the plates 19 on the ends of the straps 16 are adapted to lie in the notches 24 and 25 to retain the straps in proper association with the handle 21. As viewed in Figs. 1 and 4, the straps are arranged for a conventionally sized battery. When a longer battery is to be carried the straps 16 must be lengthened so that the gripping jaws 8 and 9 can reach the two contact posts of the battery. In this case the straps can be disengaged from the members 23 and the sockets which they define and the strap plates 19 can be slipped down toward the opposite end of the handle 21 to engage notches formed by the members 23 at the opposite ends.

It should also be noted that there is provided a separable snap fastener 26 which is indicated in Figs. 1 and 4 and while the details of this fastener are not shown it is of a conventional type such as the usual glove fastener. It is used to separably connect the two straps 16 adjacent their overlying ends since the straps are relatively stiff and when there is no weight imposed upon them they are likely to become disengaged from the T shaped catches 23.

When a battery is to be picked up and moved the user of the device initially positions the jaws 8 and 9 on the battery posts by pressing them together at their upper ends so that the lower ends of the jaws will separate and easily slip onto the binding posts 7. The springs 11 in the gripping jaws will retain the jaws on the posts. Then the handle 21 is grasped and pulled upwardly, and as the weight of the battery resists the upward pull the straps 16 will pull the cam members 14 upwardly around the pivots 15 causing the upper or outer ends of said cam members 14 to press against the inner wall of the upper end of each of the jaws 8 with considerable force, and the lower ends of the jaws 8 and 9 will be pressed toward each other to tightly grip the binding posts of the battery in a manner which prevents slippage. When the battery has been carried to the desired location it can be placed on the ground and the cam members 14 will be relieved of the tension which has been placed on them so that the pairs of jaws can be pressed together at their upper ends to quickly and easily release the device from the binding posts of the battery 5.

It is important to note that my battery carrier is adaptable for gripping battery posts without regard to which gripping element is fastened to either the positive or negative post of the battery. These battery posts are of different sizes on individual batteries and heretofore carriers have been made with one gripping element of a size to fit the positive terminal and the other gripping element of a different size to fit the negative terminal. Furthermore, as stated in the beginning of the specification, my device will operate efficiently even though the terminal posts may have become considerably worn.

The device is one which can be economically formed with most of the parts of sheet metal, and it can be folded into a rather compact unit when not in use. Its construction is such that it will fit battery posts of a number of sizes without any adjustment and due to the weight of the battery the gripping force applied is such that even if quickly and more or less carelessly applied it will still hold batteries safely.

It will, of course, be understood that various changes may be made in the form, details, arrangement and proportions of the various parts without departing from the scope of my invention.

What is claimed is:

1. A carrier for storage batteries and the like comprising, a pair of jaw elements pivoted together intermediate their ends, one end of said jaw elements being adapted to engage a battery post, a cam device pivotally connected to one of said jaw elements adjacent the opposite end thereof from said battery post engaging portions, and a handle member connected to said cam device and adapted to swing the same toward the other jaw when said handle is lifted.

2. A carrier for storage batteries and the like comprising, a pair of pivoted jaws adapted to engage a battery post, spring means normally urging portions of said jaws together to initially grip the post, and a cam device pivotally connected to one of said jaws and swingable toward the other of said jaws to increase the gripping action of said jaws above that afforded by said spring means.

3. A carrier for storage batteries and the like comprising, a pair of jaws pivotally connected intermediate their ends, said jaws having cooperating substantially semi-circular battery post engaging portions, a spring interposed between said jaws to impart an initial gripping action thereto, a cam device pivotally connected to one of said jaws at the opposite end thereof from said post engaging portions and swingable to engage with the other of said jaws to forcibly supplement the gripping action of said spring, and a handle connected to said cam device and operable when lifted upwardly to bring said cam device into engagement with the other of said jaws.

4. A carrier for storage batteries and the like comprising, a pair of gripping units each made up of a pair of pivoted jaws, the pivotal connections between said jaws being intermediate the ends thereof, a cam device on one jaw of each pair and swingable into engagement with the other of a pair to spread the jaws adjacent said cam device and to force said jaws together at other portions to grip a battery post, said cam devices including outwardly extending portions directed generally toward each other, and a handle interconnecting said cam devices and adapted to swing said cam devices against said other jaws of said pairs when an upward pull is exerted on said handle.

5. A carrier for storage batteries and the like comprising, a pair of jaws pivotally connected intermediate their ends, said jaws having battery post gripping portions, said gripping portions comprising oppositely disposed sets of teeth on said jaws, spring means carried by said jaws to urge the gripping portions of said jaws toward each other, said spring means exerting an initial relatively weak gripping action on said jaws sufficient to maintain them in position on a battery post, and means associated with said jaws for forcibly spreading said jaws apart at one end and together at their gripping portions supplementary to the action of said spring means.

6. A carrier for storage batteries and the like comprising, a pair of battery post engaging units adapted to be removably engaged with said posts, a carrying handle disposed substantially horizontally in carrying position, and a pair of straps interconnecting said post gripping units and said handle, and the ends of said straps engaging said handle being adjustably movable relative to said handle to shorten or lengthen the overall dimensions of said strap and handle assembly between said pair of post gripping units.

7. A carrier for storage batteries and the like comprising, a pair of battery post engaging units, a handle having a plurality of spaced strap engaging portions, a pair of straps each having an end connected respectively to one of said gripping units, and the other end of each strap having means for engaging and being retained by said spaced strap engaging portions of said handle.

8. The structure in claim 7 and said straps overlapping at those ends thereof which engage said handle, and means for detachably connecting said ends of said straps.

LEON S. WILLIAMSON.